US008660490B2

(12) United States Patent
Cattuto et al.

(10) Patent No.: US 8,660,490 B2
(45) Date of Patent: Feb. 25, 2014

(54) WIRELESS HARDWARE DEVICE FOR DETECTING RELATIONS OF DISTANCE, AND SYSTEM FOR MONITORING RELATIONS OF DISTANCE BETWEEN WIRELESS HARDWARE DEVICES

(75) Inventors: Ciro Cattuto, Perugia (IT); Milosch Meriac, Berlin (DE); Brita Meriac, Berlin (DE); Wouter Van Den Broeck, Paris (FR); Alain Barrat, Marseilles (FR); Jean-Francois Pinton, Collonges au Mont d'or (FR)

(73) Assignees: Fondazione I.S.I., Turin (IT); Bitmanufaktur GmbH, Berlin (DE)

( * ) Notice: Subject to any disclaimer, the term of this patent is extended or adjusted under 35 U.S.C. 154(b) by 893 days.

(21) Appl. No.: 12/788,960

(22) Filed: May 27, 2010

(65) Prior Publication Data
US 2011/0019562 A1    Jan. 27, 2011

(30) Foreign Application Priority Data
May 27, 2009 (IT) .............................. TO2009A0405

(51) Int. Cl.
*H04B 7/00* (2006.01)
(52) U.S. Cl.
USPC ............ 455/41.2; 455/63; 455/67.3; 370/252
(58) Field of Classification Search
USPC ......................... 455/41.2, 63, 67.3; 370/252
See application file for complete search history.

(56) References Cited

U.S. PATENT DOCUMENTS

| | | | | |
|---|---|---|---|---|
| 3,636,330 A | * | 1/1972 | Holeman et al. | 701/513 |
| 4,584,575 A | * | 4/1986 | Ryckeboer | 370/462 |
| 5,760,747 A | * | 6/1998 | McCoy et al. | 343/728 |
| 6,681,100 B1 | * | 1/2004 | Ge | 455/78 |
| 2005/0012656 A1 | | 1/2005 | Reisman et al. | |

FOREIGN PATENT DOCUMENTS

| | | |
|---|---|---|
| EP | 1 736 793 A1 | 12/2006 |
| WO | WO-2007/070571 A2 | 6/2007 |
| WO | WO-2007/130746 A2 | 11/2007 |

OTHER PUBLICATIONS

Forno et al. "Design and implementation of a Bluetooth ad hoc network for indoor positioning—Microsoft Research embedded systems," IEE Proc. Softw. vol. 152, No. 5, 223-228 (Oct. 2005).
Italian Search Report dated Jan. 5, 2010, issued in parent Italian Application No. TO20090405.

* cited by examiner

*Primary Examiner* — Edward Urban
*Assistant Examiner* — Hsin-Chun Liao
(74) *Attorney, Agent, or Firm* — Venable LLP; Robert S. Babayi; Robert Kinberg (57) ABSTRACT

Described herein is a wireless device, provided with: a transceiver module, which transmits data packets that have a transmission-power level selectable from among a number of power levels and include information of the transmission-power level, and receives data packets from surrounding devices; and a control unit, which is connected to the transceiver module and controls the transmission and reception of the data packets by the transceiver module. The control unit carries out processing operations on the data packets received from the surrounding devices in a detection time interval in order to determine proximity relations between the wireless device and said surrounding devices.

20 Claims, 7 Drawing Sheets

WIRELESS HARDWARE DEVICE FOR DETECTING RELATIONS OF DISTANCE, AND SYSTEM FOR MONITORING RELATIONS OF DISTANCE BETWEEN WIRELESS HARDWARE DEVICES

CROSS-REFERENCE TO RELATED APPLICATIONS

The present application claims priority to Italian Application No. TO2009A 000405, filed May 27, 2009, the contents of which are herein incorporated by reference in its entirety.

BACKGROUND

1. Technical Field

The present disclosure relates to a wireless hardware device for detecting relations of distance, in particular relations of proximity, with respect to other similar wireless hardware devices, and to a system for monitoring relations of distance between wireless hardware devices. The ensuing disclosure will make particular reference, without this implying any loss of generality, to the use of this wireless hardware device and monitoring system for high-resolution dynamic mapping of interactions between individuals in a given context of social aggregation.

2. Description of the Related Art

As is known, in the last few years there has arisen an increasing interest in the study of the patterns of social interaction, aimed at obtaining a greater understanding on the phenomena of creation and evolution of the contacts occurring between a number of individuals. An understanding of these phenomena can prove of fundamental importance, for example, for forecast and control of the spread of contagion due to infectious illnesses, which occurs following upon the so-called direct or respiratory contact, or else for monitoring and control of processes of formation of public opinion, or also for creation and management of mobile wireless networks in environments in which access to network infrastructures cannot be guaranteed.

Even though a detailed characterization of these phenomena is certainly required for reaching an analytical understanding thereof, up to now it has been difficult to obtain representative empirical data on which to build such a characterization. In particular, many of the available studies have prevalently concentrated on static characterizations of the models of interaction between individuals, neglecting important properties that occur in the time dimension, amongst which the duration, frequency, simultaneity, and causality of the contacts.

More recently, there has been proposed the use of modern wireless communications technologies, amongst which Wi-fi, Bluetooth or infrared (IR) technology, to carry out collection of data both on the structural and on the temporal aspects of the patterns of social interaction. For this purpose, there has been proposed the use of a plurality of wireless devices carried by individuals during mutual interactions, and of techniques for detecting the mutual positions and distances of the various wireless devices, on the basis of which it will be possible to infer the contacts and interactions that occur between the corresponding individuals. In said systems, there is always envisaged a centralized processing (carried out, for example, by a central processing server) of the information of contact detected by the various wireless devices (and transmitted in an appropriate way to the server).

For example, Formo F. et al.: "Design and implementation of a Bluetooth ad hoc network for indoor positioning", IEEE Proceedings: Software, IEE, Stevenage, GB, vol. 152, no. 5, Oct. 7, 2005, pages 223-228, discloses an architecture for indoor positioning based on Bluetooth sensors. Distance from sensors is estimated using inquiry reports issued at different cyclic power levels, while a centralized positioning system collects data sent by the sensors through an ad-hoc network formed by the same sensors. In particular, each sensor collects responses to the inquiry packets received from other sensors and retransmits these responses to a centralized server together with its identity; the centralized server centrally processes the received responses in order to determine a distance relation between the sensors.

WO 2007/130746 A discloses a system for distance estimation between a central electronic device and one or more remote electronic devices. The central device generates packets of data at different power levels and transmits these data packets to the one or more remote devices. The remote devices receive these data packets and perform a packet loss rate (PLR) computation; the remote devices also transmit to the central device the computation results. The central device receives the computation results from each remote device and centrally performs an estimation of the distance to the various remote devices, based on this computation result; accordingly, a distance between the central device and each remote device may be centrally determined at the central device.

These systems have not, however, proven satisfactory for a series of reasons. In particular, their spatial and temporal resolution has proven unsatisfactory for obtaining reliable information on the phenomena of social interaction; these systems enable detection of the local proximity between the various wireless devices, which, however, not necessarily is indicative of a contact or social interaction having occurred between the individuals that carry said wireless devices.

In addition, the aforesaid systems cannot be easily used for monitoring a large number of individuals, mainly due to the centralized and static nature of the distance processing operations (which are indeed carried out at a central processing server or electronic device).

Recently, the use has also been proposed of RFID (Radio Frequency Identification) devices, the so-called "RFID tags" (in particular of the active type), in the context of detection of the models of social interaction. The RFID tags are each associated to a respective individual, and are designed to be detected by fixed infrastructures uniformly arranged in the detection environment. The RFID tags transmit continuously data packets that are received by the fixed infrastructures and conveyed by these to a central processing server. The latter analyses the data and infers the position of the various RFID tags and the corresponding relations of distance (from which it infers the contacts that have occurred between the individuals).

The reliable location of the environmental position of the RFID tags requires, however, a large number of fixed reception stations, and is subject to errors that cannot be controlled a priori and limiting the spatial and temporal resolution in the detection of the contacts, amongst which the possibility of creation of multiple paths, of phase fluctuations, etc.

In particular, as it is known, a wide range of techniques for determining the mutual position of a transmitter and of a receiver are currently available (that can be used in the aforesaid systems for detecting contacts between individuals). Amongst these techniques there are, for example: techniques based upon the differences in times of arrival (so-called TDoA—Time Difference of Arrival, or E-OTD—Enhanced Observed Time Difference), in which two or more synchronized transmitters transmit data packets, and a receiver calculates the distances on the basis of the observed time differences of arrival of the same data packets; techniques based upon the time of arrival (ToA), in which distances are estimated on the basis of the speed of propagation of the signals; techniques based upon the effective measurement of the strength of the signal received (the so-called RSSI—Received-Signal-Strength Indicator); techniques based upon the carrier-signal phase, which are used for improving the precision of the previous measurement approaches, up to resolutions of less than the wavelength; and techniques based upon the cell of origin, which are based upon the visibility of a transmitter having a unique identifier code.

However, none of above techniques has proven satisfactory in association with the use of RFID tags (or of other wireless devices) in the framework of detection of the social interactions between individuals. In particular, it is known that the strength of the signal received can be measured in a reliable way only by transmitting long data packets, a fact that increases the danger of collision and does not enable scalable deployment of a large number of RFID devices (which is instead necessary for the aforesaid application). In addition, the transmission of long data packets entails a considerable power consumption (and hence does not enable prolonged monitoring operations to be carried out, as would instead be necessary). The estimation of the distances on the basis of the times of arrival requires a synchronization and a common time-base between the various devices, characteristics that are not easy to obtain in environments characterized by a high mobility (such as precisely those inherent in detection of contacts between individuals, amongst which conference centers or centers for other social events, during which the distances and visibility between the various devices change continuously).

BRIEF SUMMARY

The aim of the present disclosure is to solve, either totally or in part, the problems highlighted above, and in particular to provide a system for detecting relations of distance and/or proximity between wireless hardware devices, having an improved precision and reliability, as well as a corresponding wireless hardware device.

One embodiment of the present disclosure provides a wireless device that solves, either totally or in part, the problems highlighted above, and in particular has an improved precision and reliability in detecting relations of distance and/or proximity with other wireless hardware devices. The wireless device is provided with: a transceiver module, which transmits data packets that have a transmission-power level selectable from among a number of power levels and include information of the transmission-power level, and receives data packets from surrounding devices; and a control unit, which is connected to the transceiver module and controls the transmission and reception of the data packets by the transceiver module. The control unit carries out processing operations on the data packets received from the surrounding devices in a detection time interval in order to determine proximity relations between the wireless device and said surrounding devices.

Another embodiment of the present disclosure provides a monitoring system, comprising a plurality of the wireless devices, and configured to implement a distributed processing for determination of proximity relations between the wireless devices.

BRIEF DESCRIPTION OF THE SEVERAL VIEWS OF THE DRAWINGS

For a better understanding of the present disclosure, preferred embodiments thereof are now described, purely by way of non-limiting example and with reference to the annexed drawings, wherein.

DETAILED DESCRIPTION

As will be clarified in what follows, one aspect of the present disclosure envisages carrying out monitoring of relations of distance, for example between individuals for monitoring mutual interactions, using wireless hardware devices (for example active RFID tags) configured so as to implement bi-directional communications of data packets, and moreover so as to carry out locally (i.e., on board the devices themselves) processing of the data packets received from surrounding devices in order to obtain information on the relations of distance/proximity with respect to the same surrounding devices. In other words, the wireless hardware devices, instead of acting as simple repeaters that passively emit signals that are to be received by fixed stations (or "readers") and processed in a centralized way by a fixed data-collection infrastructure (substantially as occurs in some systems of a known type, as the ones cited above), are able to exchange messages in "peer-to-peer" mode to sound out the surrounding environment and implement a dynamic and distributed, instead of centralized, processing of the relations of distance/proximity. The processing is carried out on board of the same devices, which are distributed in the environment to be monitored, autonomously and independently from a central server apparatus, the communication scheme between the devices being dynamically reconfigured according to the movement pattern of the individuals carrying the same devices. The monitoring system consequently exploits a dynamic, decentralized, distributed, and scalable detection (in so far as there may be envisaged the use of any desired number of devices, without this imposing restrictions on an associated fixed data-collection infrastructure).

Figure 1:
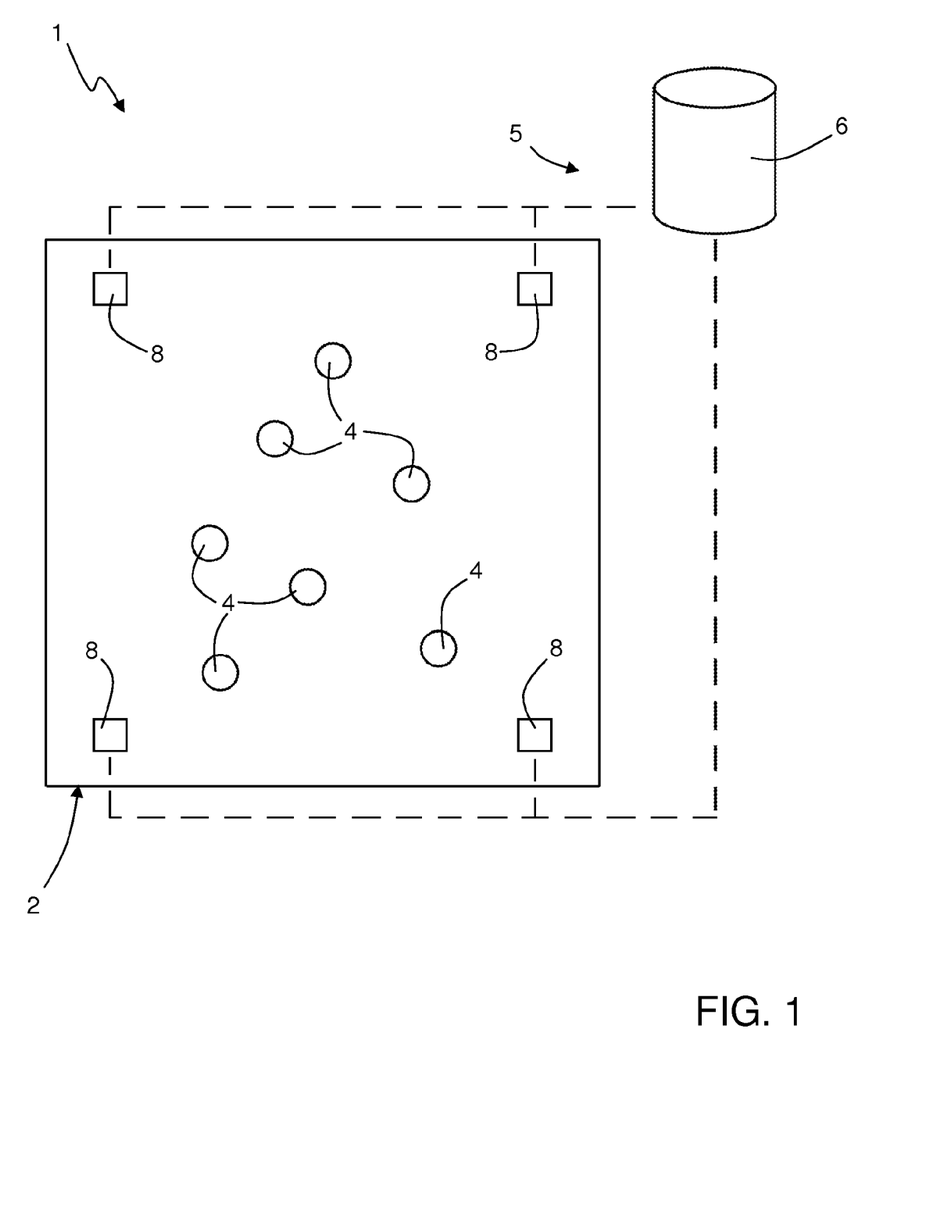
FIG. 1 is a schematic representation of a system for monitoring relations of distance between wireless hardware devices, according to one aspect of the present disclosure.

FIG. 1 shows a system 1 for monitoring contacts between individuals (or, in a similar way, the mutual relations of distance/proximity), inside a monitoring environment 2 (for example, an environment in which a conference is taking place, the waiting room of a public premises, etc.).

The monitoring system 1 comprises a plurality of wireless hardware devices 4, for example of the active RFID type, each associated to a respective individual present within the monitoring environment 2. For example, the wireless hardware devices 4 are advantageously integrated in (or made in the form of) a badge carried by the respective individual, on the front of his body.

The monitoring system 1 further comprises a data-collection infrastructure 5, which is designed to co-operate with the various wireless hardware devices 4 and is constituted by: a central processing server 6, which is also located within the monitoring environment 2, or, as illustrated, remotely with respect to the same environment; and a plurality of fixed stations 8, which are distributed at appropriate positions within the monitoring environment 2 (or in its proximity) and are designed to communicate with the wireless hardware devices 4, and, for example via a local network, such as an Ethernet, with the central processing server 6.

Figure 2:
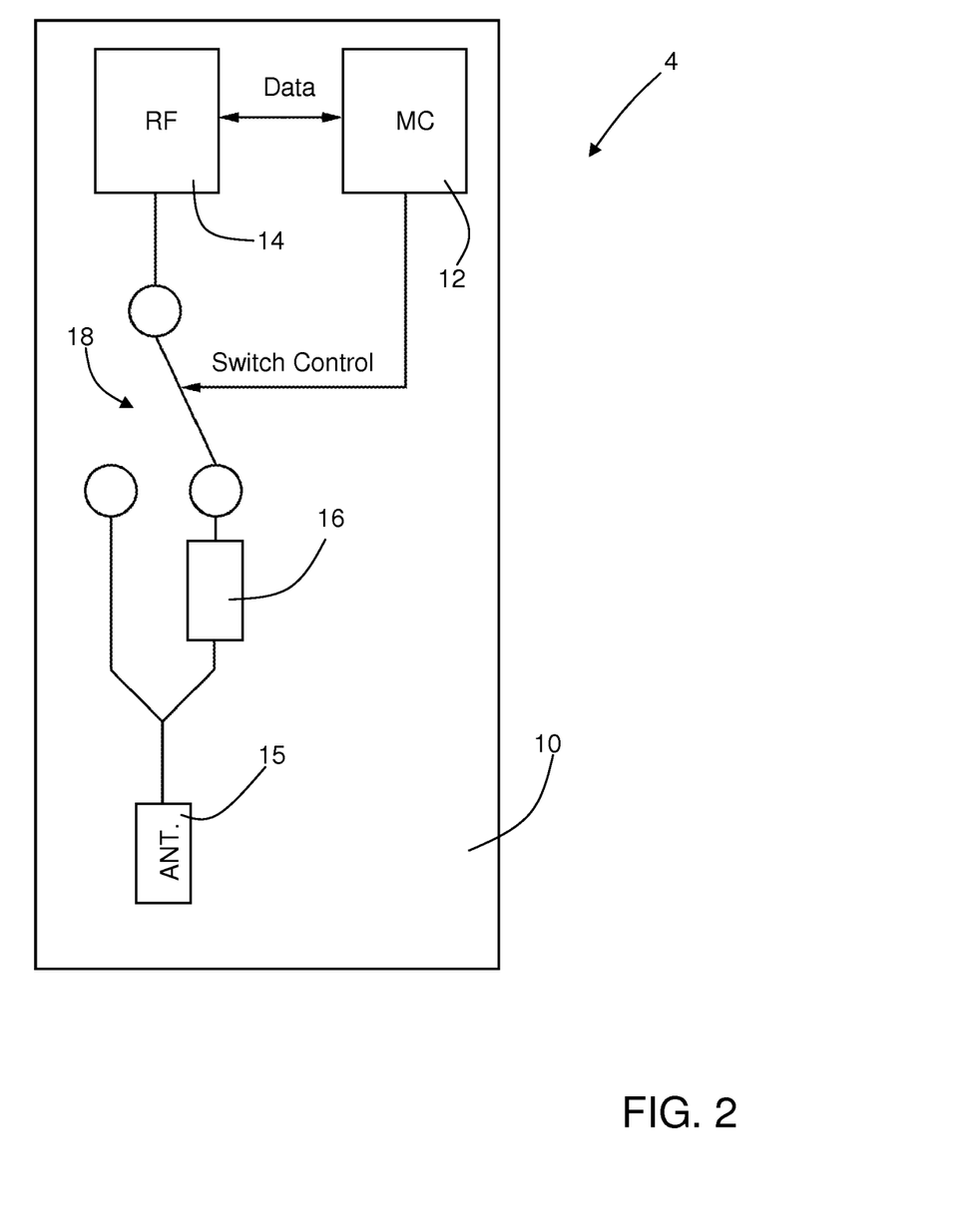
FIG. 2 is a schematic block diagram of the architecture of a wireless hardware device in the system of FIG. 1.

In greater detail, and with reference to FIG. 2, each wireless hardware device 4 comprises a printed circuit 10, coupled to which (so as to be electrically connected in an appropriate way) are: a control unit 12, of the microprocessor type (designated by MC); a transceiver module 14, which can be actuated by the control unit 12 for implementing a bi-directional communication, i.e. a reception and transmission of data packets at a radiofrequency (RF) (for example with a frequency of 2.4 GHz), as well as a data exchange with the control unit 12; and an antenna 15, which is to be operatively coupled to the transceiver module 14 for implementing transmission and reception of the RF data packets. As will be described in detail in what follows, the control unit 12 is able to carry out a local processing of the data packets received, in order to locally obtain relations of distance/proximity with respect to surrounding wireless hardware devices 4; the control unit 12 is also able to forward data on the contacts detected, and/or the processing operations carried out locally, to the fixed stations 8 of the data-collection infrastructure 5 (for example, for a subsequent processing, at a global level, by the central processing server 6).

The wireless hardware device 4 further comprises an attenuation stage 16, connected to the antenna 15, and to the transceiver module 14 via the interposition of a switch stage 18. The attenuation stage 16, which is of a type in itself known (and for this reason is not described in detail herein), is configured so as to attenuate the signals both in transmission and in reception, and in particular so as to attenuate the signals that it receives from the transceiver module 14 before they are transmitted through the antenna 15, or else so as to attenuate the signals received by the same antenna 15, before they reach the transceiver module 14. The switch stage 18 is controlled by the control unit 12 and can be switched between two operative positions: a first operative position, in which it directly connects the antenna 15 to the transceiver module 14 (so as to implement a transmission/reception without attenuation); and a second operative position in which it connects the antenna 15 to the transceiver module 14 via interposition of the attenuation stage 16 (so as to implement an attenuated transmission/reception).

Also the attenuation stage 16 and the switch stage 18 are conveniently coupled to the printed circuit 10, which moreover has a rigid cover (not illustrated) or a coating (which is not illustrated either), for example made of resin, and has small dimensions, for example the dimensions of a common identification badge.

There now follows a description of operation of the wireless hardware device 4, for recognition of similar wireless hardware devices in the monitoring environment 2 and detection of the mutual relations of distance/proximity.

In general (and as will be described in detail hereinafter), the wireless hardware devices 4 carry out a scan of the surrounding environment, alternating cycles of transmission with cycles of reception of data packets.

During the periods of transmission, low-power data packets, with variable power levels that can be selected via software by the control unit 12, are emitted in the monitoring environment 2; the data packets are labeled as distance/proximity-detection packets, using a special field contained in the same packets and/or using a specific radio frequency.

During the reception step, the wireless hardware devices 4 remain, for a certain period of time, in listening mode awaiting reception of data packets sent by surrounding devices. Using the information of the strength (or power level) of the transmission signal contained in a specific field of the data packets received, the wireless hardware devices 4 (and in particular the corresponding control units 12) estimate mutual distances on the basis of statistics of the losses of data packets at each power level; in particular, average drop rate of data packets for each power level is used for determining the information of distance. In order to carry out the aforesaid statistical analysis, it is hence advantageous to associate to the specific field of the data packets (in addition to the power information) a counter, which will supply an indication as regards the number of data packets emitted in transmission for each power level.

In the case of devices that are at a considerable distance from one another, only the data packets with higher power are received, in so far as the packets with lower power are subject to considerable data losses. Clearly, as the distance decreases, also data packets at lower power levels start instead to become "visible". In particular, it is evident that the use of a wide range of power levels for transmission of the data packets between the various wireless hardware devices 4 enables maximization of the information content (in the sense of Shannon's theorem) associated thereto as regards detection of mutual distances. In fact, the use of different power levels means that a wide range of "classes" of distances can be distinguished and discriminated and that the data drop rates vary significantly as the distance varies (in fact, in a known way, the variation of the data drop rates as the distance varies changes significantly at the various transmission power levels).

The control unit 12 moreover carries out, on board each wireless hardware device 4, operations of aggregation of the information of detection of the contacts with surrounding devices, filters the same information, and stores it in an internal memory and/or forwards it to the data-collection infrastructure 5. In greater detail, the control unit 12 of each wireless hardware device 4 is configured so as to examine in real time the data packets received from the surrounding devices over a given time interval (using a so-called "sliding window") so as to obtain therefrom information on the relations of proximity with other wireless hardware devices 4 in the monitoring environment 2; this time interval represents the "duty cycle" of the device.

According to a first algorithm, the control unit 12 stores in an internal memory buffer (organized e.g. as a list or as a circular loop) the identifiers of the wireless hardware devices 4 that it detects in the surrounding environment. For each of these devices, information is stored on the minimum power level of the data packets received by the same device, and on the number of data packets received at the minimum power level. In this regard, it is once again emphasized that the power of the signal received is not calculated by the receiving wireless hardware device, but is simply read by the device, given that it is contained in the received data packet. The aforesaid information on the number of data packets received at the minimum power level by each wireless hardware device 4 in the surrounding environment represents the relevant information for detecting the relations of proximity between the devices, and hence may be the only information being stored.

Advantageously, the control unit 12 determines a "score" (or a quality, or importance, measure) on the data packets received from the surrounding devices, based on the power level and the number of data packets received from the same surrounding device; in particular, a score is associated to the detected relations of proximity with respect to the surrounding devices. Moreover, the control unit 12 carries out a selection of the detected proximity relations, based on the computed score, filtering out those that are deemed to have a small significance (or in any case a measure of significance that does not meet a given required condition). Thanks to this selection and filtering, performed locally, the storage area required for storing the information about the proximity relations is reduced, as well as it is reduced the energy required for processing of the received data for determining the proximity relations. In particular, only the proximity relations that are judged to be significant are thus transmitted to the external data-collection infrastructure 5, or maintained in the internal memory of each device.

It should be noted that the detection process is intrinsically statistical. In fact, as will be described in detail hereinafter, for reasons of energy saving the transceiver module 14 is activated in reception only for a fraction of the duty cycle, which is followed by a sleep (or wait) phase. In order to enable a detection of the surrounding devices under the same conditions, the timing of the sleep phase is at each cycle determined randomly within a given time interval, so as to render substantially equiprobable the detection of close devices that are at one and the same distance; in particular, the duration of the time interval in which the timing of the sleep phase is randomly selected may be dynamically adjusted. In particular, advantageously, when it is found that the device is not in the range of action of other surrounding devices, nor it is close to the data-collection infrastructure 5, the duration of the time interval in which the timing of the sleep phase is selected is dynamically adjusted in such a way as to minimize power consumption; in detail, this duration is adjusted as a function of the number of packets received during a given number of the more recent preceding transmission/reception cycles. Accordingly, in prolonged absence of exchange of data with other devices and/or with the infrastructure, the duration of the sleep phase is progressively lengthened. The normal duration of the sleep phase is then restored upon detection of the presence of another surrounding device and/or of the infrastructure. In such manner, synchronization of the transceiving cycles of the various devices are avoided, and the possibility of collisions between the transmitted data packets are minimized; moreover, overall power consumption is reduced, since the devices are kept sleeping for a longer period of time during given operating conditions (e.g. when they do not exchange data with other wireless hardware devices).

At the end of the detection time interval (duty cycle), the control unit 12 has consequently gathered the information on the relations of proximity with other wireless hardware devices 4, and generates, on the basis of this information, a local proximity graph, of the star, or tree, type (i.e., being centered on the corresponding wireless hardware device 4 and connected to all the devices that have been judged as having a significant relation of proximity with the same device). A numerical indicator of importance is associated to each edge of the graph, representing e.g. the significance of the detected relation of proximity between two wireless devices (based on the power and number of the received data packets). The local proximity graph, which hence represents the aggregate information of proximity, based upon the aggregation of individual detections of contact in a given time interval, and the topological properties of the relations of proximity between the various devices, can be stored within the memory buffer of the wireless hardware device 4 and/or sent, by means of the fixed stations 8, to the data-collection infrastructure 5 and to the central processing server 6. If stored in the memory buffer (possibly associated to the indication of the related time interval), the above information may be later retrieved for further processing by an external processing apparatus.

Figure 3:
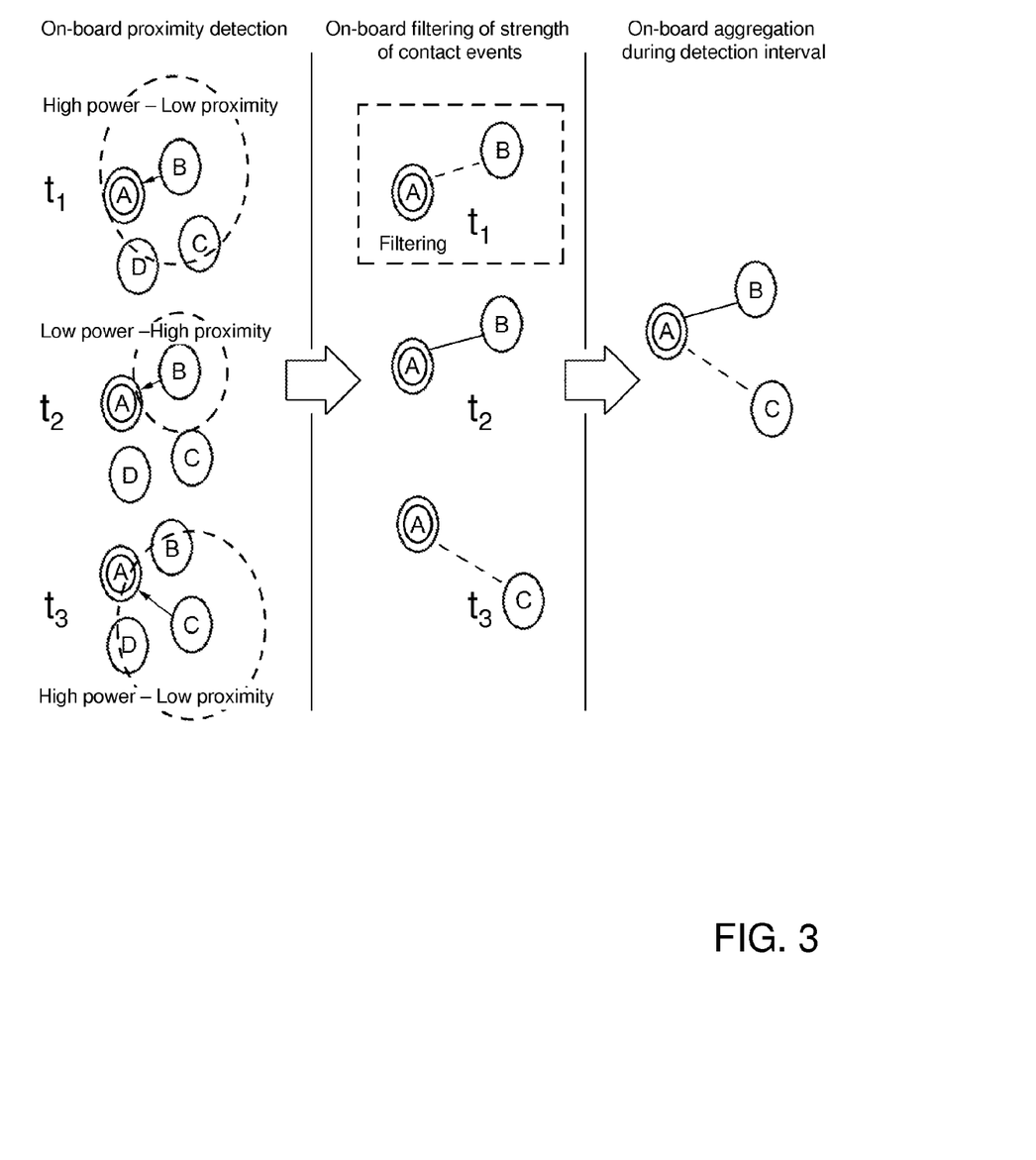
FIGS. 3 and 4 show schematic diagrams regarding data-processing operations performed locally in the wireless hardware device of FIG. 2.
Figure 4:
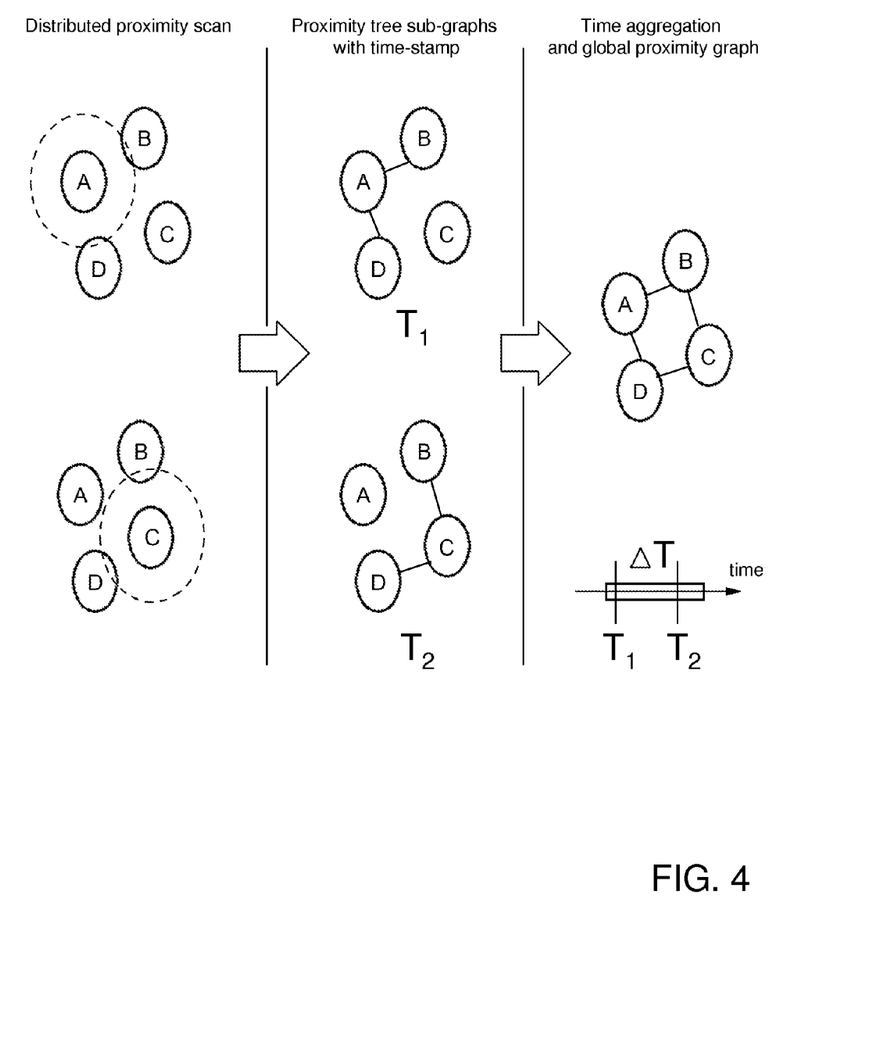

The first algorithm described previously can be better understood with reference to a simplified example, illustrated in FIGS. 3 and 4.

In particular, FIG. 3 is a schematic illustration of the process of data aggregation carried out locally at a wireless hardware device 4, designated by A, distinguishing (from left to right) the steps of: detection of the contacts during the detection time interval (by means of analysis of the data packets received); filtering of the contacts detected on the basis of the information of the power of the data packets received (and/or the score thus computed for the same contact); and local aggregation of the information of proximity for generation of the local proximity graph.

In detail, in a first reception cycle, at time t1, the device A detects a data packet at a first power level (that is defined as "high") from a first surrounding device B (the high power level indicating a "weak" relation of proximity), and hence stores a first "weak" connection between the two devices (the weak connection being graphically represented by a dashed line, and/or associated to a numerical indicator of importance having a low value). At time t2, the device A detects a new data packet transmitted by the same first surrounding device B, at a second power level (that is defined as "low", because it is lower than the aforesaid first power level, and hence indicates a "stronger" relation of proximity). Consequently, the control unit 12 eliminates (or filters out) the information previously stored on the contact with the first surrounding device B, and keeps only the information on the minimum power level of the data packets received. In particular, a "strong" connection with the first surrounding device B is now stored (the strong connection being graphically represented by a solid line, and/or associated to a numerical indicator of importance, or "score", having a high value). In a subsequent reception cycle, at time t3, the device A detects a further data packet transmitted by a second surrounding device C, in particular a high-power data packet (hence indicating a weak relation of proximity), and stores a connection of a weak type with this device. At the end of the detection time interval, the control unit 12 aggregates the various connections detected and stored (which remain after the filtering operations), creating the local proximity graph for the respective device A, in this case comprising a "strong" connection with the first surrounding device B, and a "weak" connection with the second surrounding device C. As previously explained, filtering out of the connections judged not to be significant reduces the amount of data to be stored and processed. Later, at the next detection time interval, the proximity relations of device A will be again assessed and updated according to the newly received data packets; in particular, it is evident that the processing operations for evaluation of the proximity relations are "dynamic", being updated with the passing of time and the movements occurring the monitored environment.

FIG. 4 shows the result of a further, global or high-level, aggregation, which may be carried out at the central processing server 6 of the data-collection infrastructure 5, which gathers together the various local proximity graphs and information generated by the various wireless hardware devices 4, so as to create a resulting global proximity graph (which represents the overall relations of proximity between all the wireless hardware devices in a given time interval). This global aggregation, for the reason set forth above, is distributed (because it is carried out based on the local information detected by the individual wireless hardware devices 4 distributed in the detection environment) and asynchronous (because it results from the aggregation of local proximity graphs detected and recorded at different times, within a given sliding window). The same aggregation may be performed off-line, retrieving the data stored in the internal memory of the various wireless hardware devices 4.

In particular, shown in FIG. 4 (again from left to right) are the steps of: local proximity detection, as described previously with reference to FIG. 3, of a distributed type and carried out at the various wireless hardware devices 4, in this case the devices identified by A and C (the encircled area around the devices indicating the area in which the proximity scan is carried out); aggregation, by each wireless hardware device 4, of the detected contact events (with suitable filtering of relations judged not to be relevant) for creation of the respective local proximity graph (as described previously, of the star or tree type); a time stamp is associated to each graph, in particular a time T1 for the device A and a time T2 for the device C (as will be clarified hereinafter, these times correspond to the instants at which the wireless hardware devices 4 send to the data-collection infrastructure 5, asynchronously with respect to one another, the results of the processing operations performed locally); and global aggregation, at the central processing server 6, in a given sliding window ΔT, of all the local proximity graphs, the time stamp of which falls within the same sliding window ΔT, in this case the local proximity graphs received by the device A and C at the aforesaid times T1 and T2, for creation of the global proximity graph. In particular, the individual edges of the various local proximity graphs, which indicate the relations of proximity detected in a spatially distributed and asynchronous way (and to which a numerical indication of importance may be associated), are composed in the global proximity graph.

The global proximity graph thus constructed, which represents contacts between the individuals that have occurred in the monitoring environment 2 during the sliding window ΔT, can be conveniently represented on a display device associated to the central processing server 6, or else used for carrying out further processing operations or analyses, or can be stored within a memory of the same central processing server 6.

A second algorithm for obtaining the information of proximity between the wireless hardware devices 4 (which can be executed as an alternative to, or in combination with, the first algorithm) envisages that the control unit 12 on board each device executes a different processing operation, in particular additional operations of local aggregation, of the contacts detected.

In particular, the control unit 12 keeps a memory buffer (of the list type or of the circular-loop type) for storing the identifiers of the surrounding devices detected (at the previous processing interval). Once again, in order to minimize the power consumption, the period of reception is limited to a fraction of the duty cycle, and moreover the transmission periods are determined randomly within a given rage, in such a way as to render the events of contact associated to surrounding devices set substantially at the same distance substantially equiprobable.

In this case, associated to the identifier of each surrounding device is a weight, which represents a degree of proximity (e.g. expressed as a number) between the same surrounding device and the receiving device; the weight is updated in time, at each reception cycle and considering each detected data packet coming from the same surrounding device. In particular, whenever a data packet at a given power level is detected, the weight is incremented by a value corresponding to the power level detected (on the basis of a look-up table that gives the correspondence between the detectable power levels and the increment/decrement value to be applied to the aforesaid weight). In addition, at the end of each reception cycle, subtracted from each weight is a fixed (or variable) quantity, a so-called "ageing" quantity, in such a way that the weight of a device that is no longer visible (and from which no data packets have recently being received) drops progressively to zero, indicating the interruption of the relation of proximity with the receiving device. Consequently, for each surrounding device that is detected, the resulting weight associated to its identifier is given by the combination of two processes: the stochastic increment associated to each received data packet; and the deterministic correction linked to the "ageing" effect. The value of the weights at the end of the detection time interval represents a measurement of the relations of proximity with the various surrounding devices, obtained once again by means of the local aggregation (i.e., carried out at each wireless hardware device 4) of the contact information associated to the various data packets received. The resulting weights processed by each wireless hardware device 4 can then be sent to the data-collection infrastructure 5 by means of the fixed stations 8, for a subsequent processing and aggregation (in particular, for grouping together the information of local proximity detected by the various wireless hardware devices 4 in the monitoring environment 2) and/ore stored internally to each wireless hardware device 4.

Advantageously, the first and second algorithms, instead of being executed in an alternative way in the monitoring system 1, can be executed in combination so as to supply results that can be used in a complementary way for detecting the relations of proximity between the various wireless hardware devices 4. In any case, it is once again emphasized that the data-collection infrastructure 5 receives already from the individual control units 12 of the wireless hardware devices 4 accurate information on the relations of proximity of the devices themselves with the surrounding devices, aggregated in a given time interval, without it being necessary to carry out further processing operations in this regard (except for operations of aggregation at a global level of the information received from the various devices); the information may also be stored in the wireless hardware devices 4, if no data-collection infrastructure 5, and retrieved and processed off-line.

Figure 5:
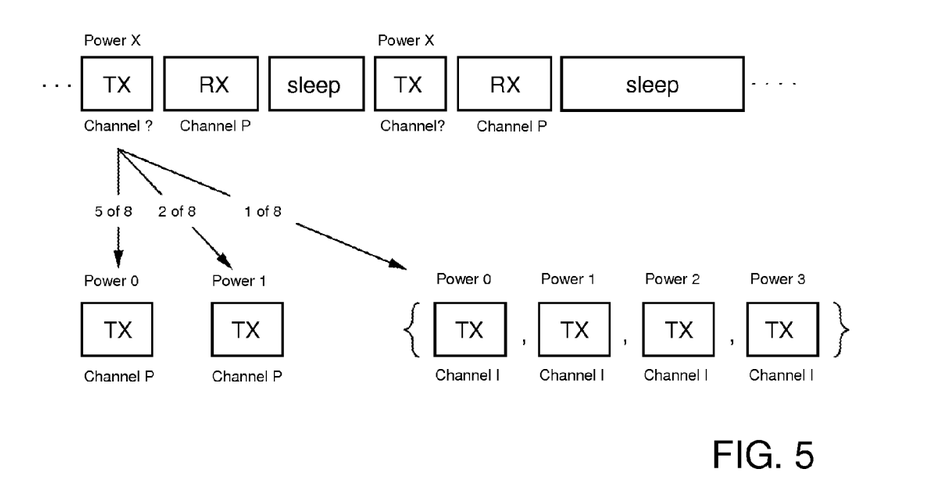
FIG. 5 is a schematic illustration of the structure of a protocol for transmission/reception of data packets used by the wireless hardware device of FIG. 2.

With reference to FIG. 5, described in greater detail in what follows is the protocol used by the wireless hardware devices 4 for the transmission and reception of the data packets during the bi-directional communication for mutual recognition.

In particular, this protocol envisages the continuous repetition of blocks constituted by a certain number of transmission/reception cycles, during which the wireless hardware device transmits and receives data packets for recognition of the contacts with surrounding devices and carries out the operations of processing and local aggregation of the information received; between one transceiver block and the next, the protocol moreover envisages sending by the wireless hardware device 4 of the information of distance/proximity detected locally to the data-collection infrastructure 5.

In detail, each transmission/reception cycle envisages a first sleep phase, during which the wireless hardware device 4 remains in a wait state without performing operations. This sleep phase has a duration that is given by a fixed time component S1, added to which is a time-variable component having duration S2, determined in a random way at each cycle and having a mean value <S2>; the values of the variable duration S2 are uniformly distributed in a given interval around the mean value <S2>, and this duration is dynamically adjustable (as previously described, as a function of the recently exchanged data packets), in order to decrease power consumption in given operating conditions.

After the sleep phase, the wireless hardware device 4 "wakes up" and carries out a second protocol step, in which it performs transmission of the data packets to the monitoring environment 2. In particular, for transmission, transmission schemes are used, which envisage sending of data packets at variable power levels, for example chosen among four pre-defined power levels. The data packets can moreover be transmitted on different transmission channels, for example a first channel, the so-called proximity channel, associated to which the control unit 12 activates the attenuation in transmission by means of the attenuation stage 16, and a second channel, the so-called infrastructure channel, associated to which the control unit 12 de-activates the attenuation in transmission, bypassing the attenuation stage 16 between the transceiver module 14 and the antenna 15.

For example, the use of a different scheme of transmission of the data packets may be envisaged according to the position of the associated transmission/reception cycle within the detection time interval. For this purpose, the use of a counter is envisaged, which is incremented at the end of each transmission/reception cycle, and the value of which moreover determines the end (and the overall duration) of each block of transmission/reception cycles (and, consequently, of the detection time interval) and the start of the step of sending to the data-collection infrastructure 5 of the results of local processing. For example, each block can be constituted by 32 transmission/reception cycles.

The transmission/reception protocol can envisage dividing the transmission/reception cycles of each block into groups of eight cycles, and transmitting: for the first five cycles of each group, data packets at a first power level (level 0) on a proximity channel (designated by "Channel P" in FIG. 5), i.e., with the attenuation stage 16 operative (and/or at a first radio frequency value); for the next two cycles of the group of eight cycles, data packets at a second power level (level 1, higher than the first power level), again on the proximity channel; for the last cycle of the group of eight cycles, data packets with a power level chosen cyclically from among a given number of power levels (for example, four power levels, which include the aforesaid first and second power levels and moreover a third power level, level 2, and a fourth power level, level 3; it is in any case evident that a different number of power levels through which to cycle could be equally envisaged). In particular, in the aforesaid last cycle of the group of eight cycles, successions of data packets having power levels that range from the first power level to the fourth power level are cyclically transmitted; said data packets are transmitted on an infrastructure channel (designated by "Channel I"), i.e., without attenuation (and/or at a second radio frequency value). However, it is evident that during transmission of the data packets different transmission schemes, which are more or less complex, may be adopted, for example using different combinations of the various power levels available in each of the transmission/reception cycles, on the proximity channel or on the infrastructure channel; as a further example, the transmission schemes could be configured in such a way as to ensure transmission, in the time unit, of a number of data packets that is substantially the same for each of the various power levels available.

The step of transmission of the data packets in any case requires a time interval of constant duration T; the number of data packets emitted in unit time is designated by N.

After the transmission step, the protocol envisages, for each transmission/reception cycle, a reception step, in which the wireless hardware device 4 remains in a wait state awaiting reception of data packets from surrounding devices, for a given interval of duration L; the reception step operates on the proximity channel, with the attenuation stage 16 being active. In the reception step, the operations described previously (also with reference to FIGS. 3 and 4) are carried out for detecting the contacts, on the basis of the data packets present in the reception buffer of the transceiver module 14, and the local aggregation of the contact information for generation of the proximity information (in particular, the aforesaid first and second algorithms, are executed, alternatively or jointly, analyzing, amongst other features, the identifiers of the surrounding devices and the power levels of the data packets received).

The transmission/reception protocol can then envisage an additional step (not illustrated in FIG. 5), in which the wireless hardware device 4 carries out accessory operations, such as operations of diagnosis or of switching-on of light-signaling devices (for example, a LED, designed to signal to the user proper operation of the device). This additional step may, for example, require a constant time of duration B. Next, the protocol envisages returning to the first sleep phase, and, cyclically, execution of the subsequent steps described previously.

Is may consequently be shown that the fraction $f\_L$ of the detection time interval in which the wireless hardware device 4 is operating to receive the data packets is given by the following expression:

$$f\_L = L/(S1 + <S2> + L + T + B)$$

The wireless hardware device 4 absorbs (from a corresponding supply source, for example a battery) a first current IL during the reception step, a second current IT, much lower than the first current IL (IT<<IL) during the step of transmission of the data packets, and a mean current IX, during the further operations carried out thereby.

The mean dynamic current <IL> absorbed by the wireless hardware device 4 is hence given by the following expression:

$$<IL> = (f\_L \cdot IL) + (N \cdot T \cdot IT) + ((1 - f\_L) \cdot IX)$$

The time necessary for the transmission T is usually short, so that the second term of the aforesaid expression is generally negligible. Given that the first current IL associated to the reception step is in general much higher than the current IX associated to the transmission step, it is possible to minimize the current consumption by decreasing the fraction $f\_L$ of the detection time interval in which the wireless hardware device 4 is receiving. Clearly, however, the smaller the fraction $f\_L$ the lower the likelihood of detecting the contiguous devices correctly. Consequently, for balancing this phenomenon, it is advantageous, in order to maintain the likelihood of detection high, to increase the number N of data packets transmitted per unit time.

According to a further aspect of the disclosure, the use of the attenuation stage 16, designed to provide an attenuation (or, in a mutual way, a gain) which is adjustable and controllable in a precise way via software in transmission and/or reception, advantageously enables considerable increase in the accuracy of estimation of the relations of proximity between the various wireless hardware devices 4. In particular, the adjustable attenuation enables control of the maximum distance at which the data packets can be exchanged, thus affording a good spatial resolution in the detection of proximity without jeopardizing the global range of communication of the device. In general, the attenuation at two, or possibly even more, levels, reception end and/or transmission end, can be used for defining and controlling the spatial resolution of detection of the relations of proximity between the various wireless hardware devices 4.

In greater detail, the adjustable attenuation, reception end, enables reduction, when required, of the maximum reception range for the estimation of the relations of proximity/distance; in this way, the local spatial resolution can be increased, given that the received power associated to the data packets transmitted by the surrounding devices becomes sufficient for the detection only for devices located at a smaller distance. In addition, using the adjustable attenuation, reception end, the same data packets transmitted by the wireless hardware devices 4 can be used locally, on board the devices, for determining the mutual relations of proximity, and can moreover be used by the data-collection infrastructure 5 (as described in detail in what follows) for obtaining positioning of the same devices, given that the same data packets are transmitted with a power level sufficient to be received by the fixed stations 8.

In addition, the adjustable attenuation, transmission end, enables control of the range of the proximity/distance estimations, reducing the distance at which the data packets emitted can be received (by a non-attenuated receiver). As has been highlighted previously, the attenuation can be introduced during detection of contiguous devices, whereas it can be advantageously de-activated during the operations of aggregation of the relations of proximity locally processed at the data-collection infrastructure 5. For example, it is in this way possible to transmit data packets at the minimum power level available so as to detect the proximity between individuals who carry the wireless hardware devices 4, as a badge, and, with the same transceiver module, to forward at the maximum power level the detected information to the data-collection infrastructure 5 (the same information being then forwarded to the central processing server 6, for example by means of a local network). Another advantage of the attenuation, transmission end, is that it enables increase in the number of packets (previously designated by N) that are emitted during the operating cycle of the device, without increasing the likelihood of collision with packets emitted by other surrounding devices within the monitoring environment 2. In fact, the collisions are possible only in the region in which the signal is sufficiently strong; in the case of attenuation, transmission end, the collisions are hence possible in a region of a small area around the transmitter device. Groups of devices that are at a greater distance can hence exchange data packets at a high transmission rate, without there being any risk of collision between the packets emitted by one group of devices and those emitted by another group of devices (which, instead, would occur in the absence of attenuation, transmission end). As noted previously, the increase in the number N of data packets per unit time enables increase in the likelihood of detection of close devices, without having to increase the duration of the reception step, hence keeping the energy consumption low.

In general, the aforesaid variable and adjustable attenuation, reception end and/or transmission end, can be implemented (in addition or as an alternative to what has been illustrated in FIG. 2) by means of: switching of two or more antennas present on board the wireless hardware device 4; switching/shunting of loads in the reception/transmission circuit; or controlling the gain of the radio receiver/transmitter, in a direct or indirect way.

Figure 6:
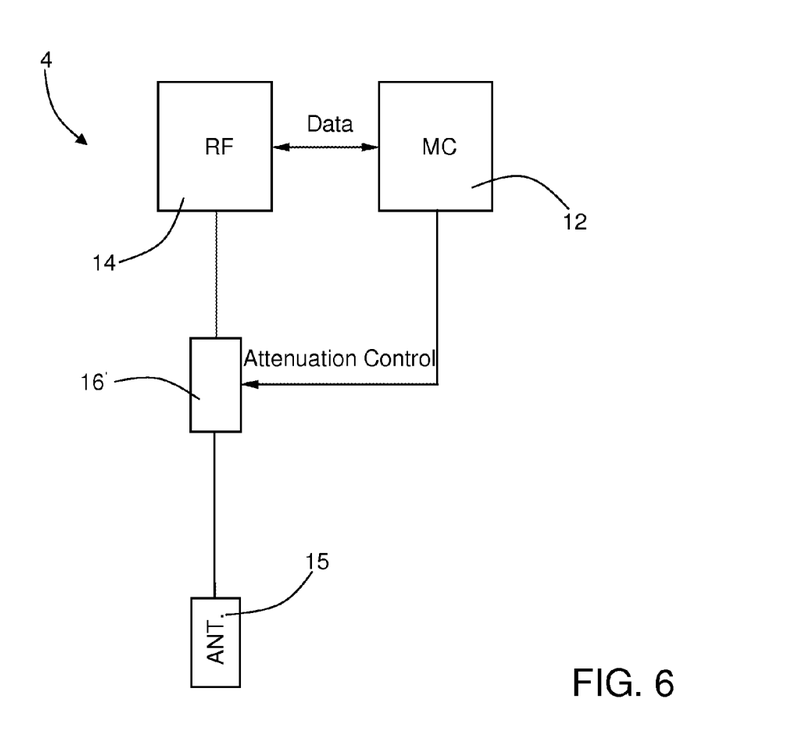
FIGS. 6-8 show overall block diagrams of variants of the architecture of the wireless hardware device of FIG. 2.

In greater detail, FIG. 6 shows a first alternative solution for providing the variable attenuation in transmission/reception.

In this variant, the attenuation stage, here designated by 16', instead of providing a fixed attenuation value, is controllable directly by the control unit 12, which can vary the value of attenuation thereof by means of a control signal. The attenuation stage 16' is in this case directly connected between the antenna 15 and the transceiver module 14 (without the presence of switch stages).

Figures 7, 8:
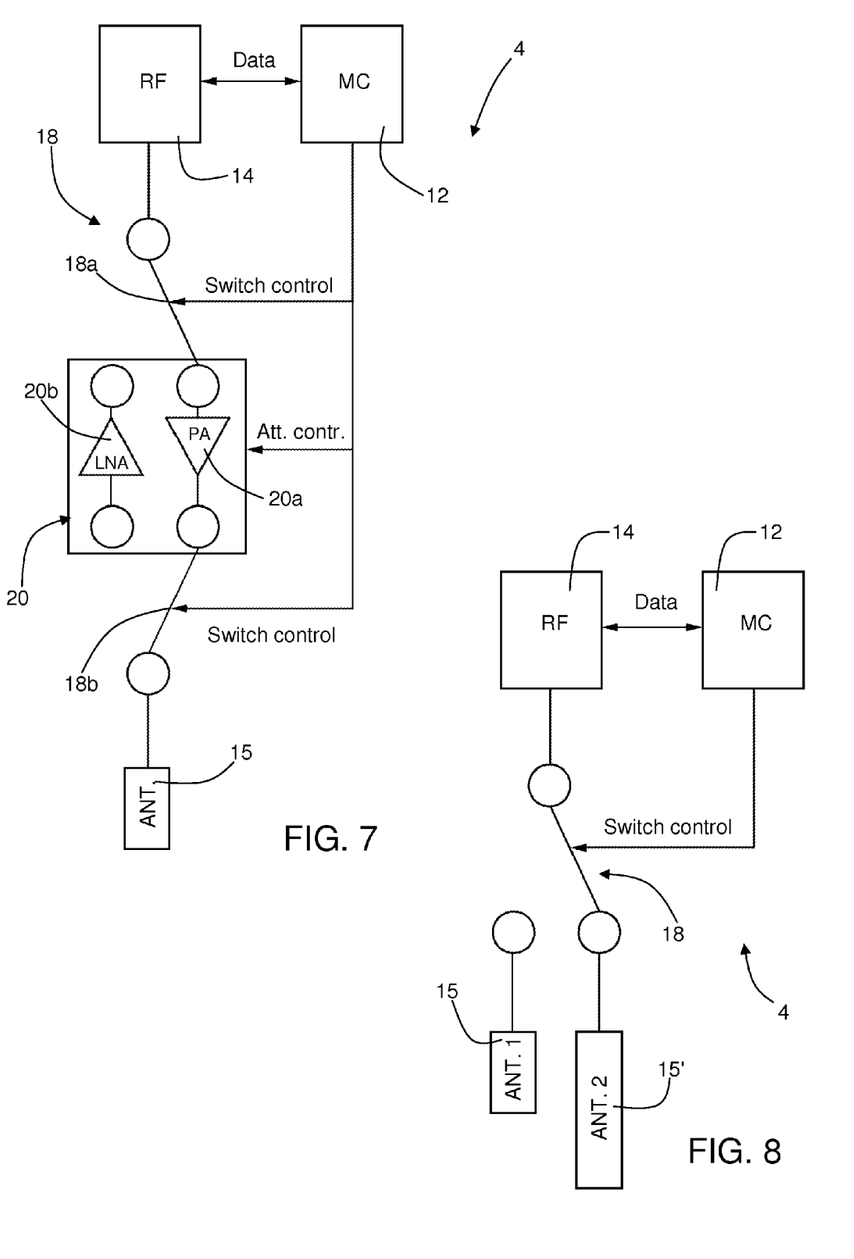

A further embodiment, shown in FIG. 7, envisages, for providing the attenuation function, an amplification stage 20, having a gain that is variable (the gain being set equal, in an evident way, to the inverse of the desired attenuation) and can be controlled directly by the control unit 12. The amplification stage 20 is selectively connected between the antenna 15 and the transceiver module 14 by means of the switch stage 18.

In particular, the amplification stage 20 comprises: a power amplifier 20a (PA) having its input that can be selectively connected to the transceiver module 14 and its output that can be selectively connected to the antenna 15; and a low-noise amplifier 20b (LNA) having its input that can be selectively connected to the antenna 15 and its output that can be selectively connected to the transceiver module 14. The switch stage 18 in this case comprises: a first switch 18a, controlled by a first control signal supplied by the control unit 12, designed to connect selectively the input of the transceiver module 14 (when used in reception) to the output of the low-noise amplifier 20b, or alternatively the output of the transceiver module 14 (when used in transmission) to the input of the power amplifier 20a; and a second switch 18b, controlled by a second control signal supplied by the control unit 12, designed to connect selectively (in reception) the antenna 15 to the input of the low-noise amplifier 20b, or alternatively (in transmission) the output of the power amplifier 20a to the same antenna 15.

A further embodiment, shown in FIG. 8, envisages the possibility, by the control unit 12, of switching on board the wireless hardware device 4 selectively between a plurality of antennas (in the figure two of them are shown by way of example, designated by 15 and 15'). In this case, the antennas 15, 15' can be selectively connected directly to the transceiver module 14 by the switch stage 18 (once again controlled by the control unit 12, by means of an appropriate control signal); the characteristics of gain of the antennas hence determine directly the desired attenuation (or gain) of the signals in reception/transmission.

The use of a plurality of antennas 15, 15' having different geometrical characteristics is advantageous also on account of the fact that it enables investigation of different geometrical properties of the spatial relations between the various wireless hardware devices 4 (and/or between the individuals who carry said devices).

For example, it is possible to use a first antenna (for example, the antenna 15) for the measurement of relations of proximity that envisage a front ("face-to-face") interaction between individuals; the first antenna 15 can be for this purpose an antenna of a "backplane" type having a sufficiently high isotropy in such a way as to irradiate uniformly the RF radiation substantially in all directions. The human body of the individual who carries the wireless hardware device 4, in the form of an identifier badge on the front of his body (for example on his chest), creates a marked anisotropy in the signal emitted (which is substantially completely absorbed by the body, when it propagates backwards towards the rear part of the body of the individual). For this purpose, it is advantageous to use, for transmission and reception of the signals, radio frequencies that are strongly absorbed by the human body. In particular, it is advantageous to use microwaves that are absorbed by the body water: the ISM radio band close to 2.4 GHz is an excellent candidate for this use. Consequently, adopting these particular solutions, it is possible to detect not only the proximity, but also the spatial orientation, of the "face-to-face" type, between individuals who carry the badges/wireless hardware devices 4.

The first antenna 15 is not, however, optimized for transmission of information to the data-collection infrastructure 5. It is hence advantageous, when it is necessary to carry out this type of transmissions, for the control unit 12 to select a second antenna 15', which is also integrated on board the wireless hardware device 4 and has greater range characteristics (and greater anisotropy).

The fact of selecting, by means of switching controlled by the control unit 12 (via software), an antenna having a marked anisotropy means that, amongst other things, a minimal relative variation in the mutual orientation of two wireless hardware devices 4 results in a marked difference in the drop rate of the data packets; this characteristic can hence be exploited for determining the position and spatial orientation between two or more wireless hardware devices 4, or individuals that carry these devices.

A further aspect of the monitoring system 1 envisages that the data-collection infrastructure 5 (and in particular the central processing server 6) is capable of carrying out a further processing of the data detected by the various wireless hardware devices 4, in particular for detecting the proximity between the same devices. This further processing can advantageously be carried out in combination with the processing previously described of global aggregation of the information of proximity locally detected by the individual wireless hardware devices 4, for example for integrating this processing and increasing the precision of proximity/position detection.

In particular, the data packets sent at the various power levels by the wireless hardware devices 4 are received by the fixed stations 8, which, by acting substantially as repeaters, retransmit them to the central processing server 6. As illustrated previously, associated to each data packet is the corresponding transmission power. The central processing server 6 processes the data packets received, and associates, as described in detail hereinafter, to each of the wireless hardware devices 4 a reception pattern (on the basis of the strength of the signals received by the various fixed stations coming from the same device, in terms of drop rates of data packets at the various transmission powers). The reception patterns are used as an electromagnetic "fingerprint", which enables identification of the individual wireless hardware devices 4, and the resemblance between the reception patterns of two or more devices is considered as an indication of spatial proximity between the same devices. With a similar technique, once again by measuring the drop rates of data packets received at the various fixed stations 8, the central processing server 6 is moreover able to infer the distances between the wireless hardware devices 4 and the fixed stations 8.

Figure 9:
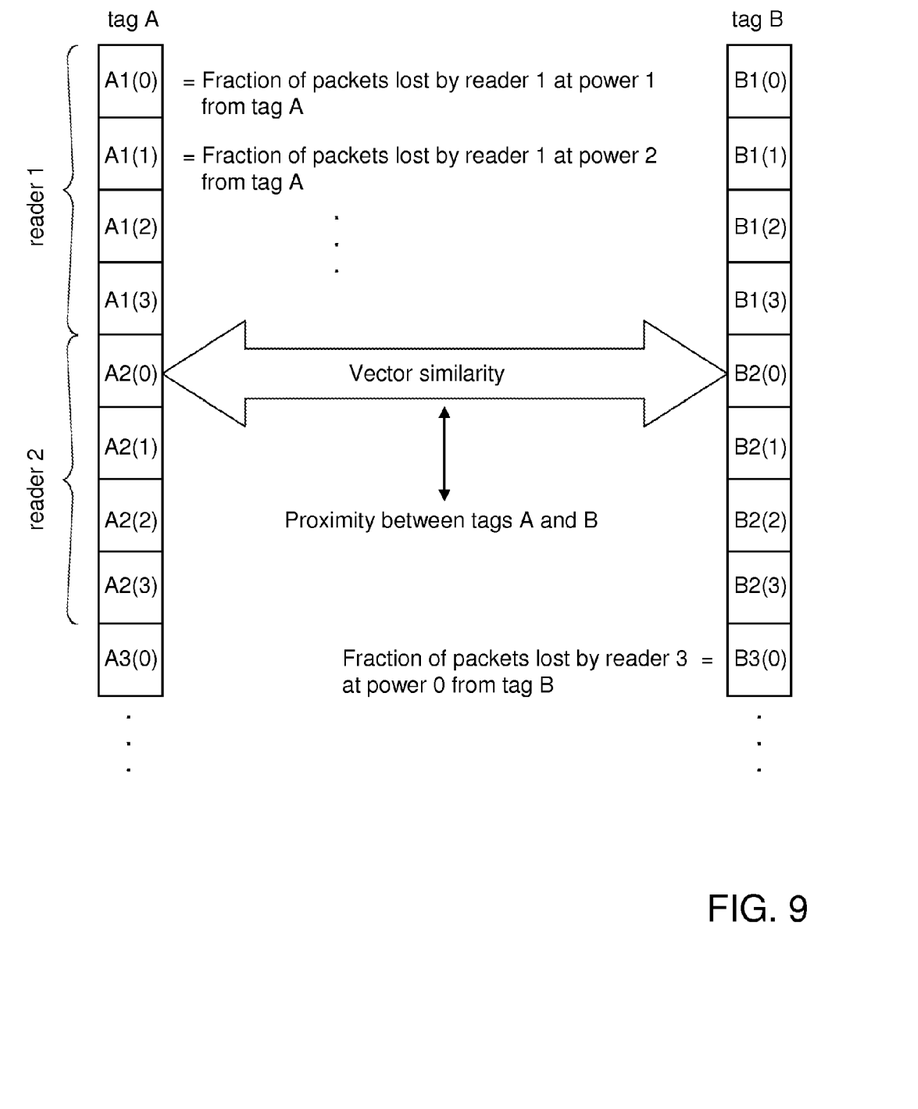
FIG. 9 shows a data-vector structure that can be used for data processing in a central processing server of the monitoring system of FIG. 1.

In greater detail, and with reference to FIG. 9, according to one aspect of the disclosure, the central processing server 6 generates, for each wireless hardware device 4, a fingerprint vector, in which each element represents the fraction of packets lost by a given fixed station 8 from among those received by the wireless hardware device 4 at a given power level (the fingerprint vector has consequently a number of components equal to the number of fixed stations 8 multiplied by the number of power levels used in transmission). The fingerprint vector for a first wireless hardware device 4, identified by A, is consequently a vector of the type:

$$A1(0)A1(1)A1(2)A1(3) \ldots Ai(0)Ai(1)Ai(2)Ai(3) \ldots AN(0)AN(1)AN(2)AN(3)$$

where the index i (which ranges from 1 to the number N of fixed stations 8) indicates the fixed station 8 that receives the data packets, which in the example are transmitted at four increasing power levels (designated by numbers 0, 1, 2 and 3).

Likewise, the fingerprint vector for a second wireless hardware device 4, identified by B, is:

$$B1(0)B1(1)B1(2)B1(3) \ldots Bi(0)Bi(1)Bi(2)Bi(3) \ldots BN(0)BN(1)BN(2)BN(3)$$

The degree of similarity between the fingerprint vectors associated to the devices A and B (evaluated using appropriate criteria, for example using the so-called "cosine similarity" between the vectors, or their mutual information) consequently indicates the relation of proximity between these devices, and hence between the individuals to which the same devices are associated.

In addition, on the basis of the similarity between the fingerprint vector for a given wireless hardware device 4 and one or more reference vectors measured in known positions, it is possible to locate the device within the monitoring environment 2. Alternatively, location can be carried out by means of a supervised machine learning of the associations between the fingerprint vectors and the positions of the corresponding wireless hardware devices 4.

On the basis of the known position of the various fixed stations 8 and of the aforesaid processing operations of the statistics of loss of data packets at the various powers (performed in the various ways described previously), the central processing server 6 is moreover able to estimate the position of the various wireless hardware devices 4 within the monitoring environment 2 by means of known techniques of triangulation, trilateration, and/or multilateration. Moreover, the central processing server 6, using the information of proximity locally detected by the individual wireless hardware devices 4, is able to improve the accuracy of the position estimate, thereby achieving a proximity-assisted positioning.

The advantages that the wireless hardware device and the monitoring system described afford emerge clearly from the foregoing description.

In particular, the system proposed and the associated local and distributed processing of the relations of distance enable a reliable detection of proximity and/or distance even in environments with high mobility. The spatial resolutions (for example, of less than one meter) and time resolutions (for example of the order of the second) are sufficiently high to follow in real time the evolution of the relations of proximity and interaction between individuals, even in extremely crowded situations in which the conditions of visibility between the various wireless hardware devices carried by the individuals change constantly, such as, for example, during conferences or other social events.

The local processing carried out within the various wireless hardware devices 4 (which communicate according to a peer-to-peer scheme of communication) makes the monitoring system 1 more efficient and independent of proper operation of a central processing server 6, and moreover enables the use of a lower number of fixed stations 8 (which can also be equal to one, in the case of environments of small dimensions). Moreover, a data-collection infrastructure may even not be envisaged, if the results of the local processing related to the detected proximity relations are stored within the various wireless hardware devices, and then suitably retrieved (off-line).

The disclosed system is clearly advantageous as compared to traditional systems based upon the use of passive tags. In particular, the wireless hardware devices 4 in the monitoring system 1 are not limited to identification of the contacts with surrounding devices (and transmission of the information of contact to a central server), but carry out on board an appropriate aggregation and an appropriate filtering of the information detected over a given detection time interval, supplying to the central processing server data that may be directly used, for example, for their display or further higher-level aggregation.

In addition, particularly useful, in order to improve the precision and resolution of detection (as well as to obtain the advantages illustrated previously), is the possibility of modifying the value of attenuation (or, likewise, of gain) of the signals transmitted and/or received by each wireless hardware device 4, directly on board the device, in an automatic way by the corresponding control unit 12.

The system described makes it possible not only to detect the proximity of devices but also to distinguish relations in which the individuals are facing each other, so as to reliably detect, for example, a conversation taking place between individuals, or the possibility of transmission of a contagion by direct contact.

The technique proposed for monitoring the relations of proximity/distance has the following advantages: it has a hardware that is much more economically advantageous as compared to traditional detection systems (for example, ones based upon time of arrival or upon time difference of arrival); it requires times of flight of the data packets that are much shorter as compared to approaches that are based just upon detection of the strength of the signal received, entailing a much lower current consumption (and a much greater duration of a battery) and moreover a lower likelihood of flight collisions; and at the same time it provides a greater accuracy as compared to other methods (for example, ones based upon the cell of origin).

Finally, it is clear that modifications and variations may be made to what has been described and illustrated herein, without thereby departing from the scope of the present disclosure, as defined in the annexed claims.

In particular, the same processing operations that have been described performed by the control unit 12 to obtain the relations of distance from surrounding wireless hardware devices can be used to obtain the relations of distance from the fixed transmission stations, in the case where the latter transmit the same data packets with associated thereto the information of the level of the transmission power.

In addition, it is evident that the monitoring system can be used also for other applications and purposes different from monitoring of the dynamics of human interactions, for example for tracking objects and goods on which respective wireless hardware devices are applied.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wireless device, comprising:
   a transceiver module, operable to transmit data packets having a transmission power level that can be selected from among a number of different power levels and including information of said transmission power level, and to receive data packets from surrounding devices; and
   a control unit, connected to said transceiver module and configured to control transmission and reception of said data packets by said transceiver module, wherein said control unit is configured to carry out processing operations on said data packets received from said surrounding devices during a detection time interval in order to determine, on board of said wireless device, proximity relations between said wireless device and said surrounding devices, wherein said transceiver module is operable to implement a transceiving protocol including cycles of transmission and reception of said data packets; each of said transmission and reception cycles being separated from a contiguous transmission and reception cycle by a random wait time, the duration of which is dynamically adjustable by said control unit in order to reduce a power consumption of said wireless device, and wherein the timing of said random wait time is determined in a random way within a given time interval; the duration of said given time interval being dynamically adjustable by said control unit and determined, in a current transmission and reception cycle, as a function of a number of data packets received during a given number of preceding transmission and reception cycles; said duration being increased when said number of received data packets decreases so as to reduce said sower consumption when said wireless device is not in the proximity of said surrounding devices.

2. The device according to claim 1, wherein said control unit is further configured to store in an internal memory, and/or transmit to an external processing device, the detected proximity relations; said proximity relations being indicative of a degree of proximity between said wireless device and said surrounding devices during said detection time interval.

3. The device according to claim 1, wherein said control unit is configured to control said transceiver module so as to implement an exchange of said data packets with said surrounding devices according to a peer-to-peer scheme of communication.

4. The device according to claim 1, wherein said control unit is configured to: obtain data of distance of said wireless device from said surrounding devices on the basis of the calculation of statistics of loss of data packets at said different power levels, on the data packets received from said surrounding devices during said detection time interval; and aggregate the data of distance of said wireless device from said surrounding devices calculated during said detection time interval for generating said proximity relations.

5. The device according to claim 1, wherein said control unit is configured to: determine, for each one of said surrounding devices and during said detection time interval, a significance measure of the associated proximity relation, based on the power level of the data packets received from said surrounding device and the number of data packets received; and to filter out the associated proximity relation in case said significance measure satisfies a given condition.

6. The device according to claim 1, wherein said control unit is configured to: determine, for each one of said surrounding devices and during said detection time interval, a minimum power level of the data packets received from said surrounding device and the number of data packets received at said minimum power level; and generate a local proximity graph, centered on said wireless device and having edges connected to said surrounding devices; a significance measure, representing an information of proximity, being associated to each one of the edges of said graph, and being determined as a function of said minimum power level and number of data packets received from the associated surrounding device.

7. The device according to claim 1, wherein said transceiver module is operable for carrying out a plurality of cycles of reception of said data packets from said surrounding devices during said detection time interval; and wherein said control unit is configured to: calculate during said detection time interval, for each one of said surrounding devices, a degree of proximity; said degree of proximity being updated upon reception and processing of the data packets coming from said surrounding devices on the basis of the respective power level and the number of received data packets; said degree of proximity being further updated at the end of a current cycle, on the basis of a correction factor, said correction factor being a function of a number of data packets received during a given number of cycles preceding said current cycle; said control unit being configured to use said degree of proximity as a significance measure of the proximity relation with the associated surrounding device.

8. The device according to claim 1, wherein said transceiver module is operable for transmitting said data packets to said surrounding devices at a first power value and at a first radio frequency value, and said proximity relations to an external data-collection infrastructure at a second power level and/or at a second radio frequency value; said second power level being higher than said first power level.

9. The device according to claim 1, further comprising: at least a first antenna that can be selectively connected to said transceiver module; and an attenuation/gain stage designed to be set between said first antenna and said transceiver module to provide an attenuation/gain of the signals transmitted and/or received by said transceiver module; wherein said attenuation/gain stage has a variable attenuation/gain value that can be selected via software by said control unit.

10. The device according to claim 9, further comprising a switching stage designed to be actuated by said control unit for selective connection of said attenuation/gain stage between said first antenna and said transceiver module.

11. The device according to claim 1, further comprising: a first antenna and at least one second antenna, which can be connected selectively to said transceiver module, said at least one second antenna having characteristics of gain/attenuation and/or geometrical characteristics that differ from those of said first antenna; said device further comprising a switching stage designed to be actuated by said control unit for selective connection of said first antenna or said second antenna to said transceiver module.

12. The device according to claim 1, of a portable type, designed to be carried by a individual on the front of the body and configured for monitoring social interactions between individuals, in particular proximity relations of the face-to-face type; wherein said transceiver module is configured to transmit said data packets at a frequency such as to be substantially absorbed by the body of said individual, thereby said data packets are received by said surrounding devices only in case of face-to-face interactions between the associated individuals.

13. The device according to claim 12, comprising a badge-shaped printed circuit board, to which said transceiver module and said control unit are connected.

14. A wireless device, comprising:
a transceiver module, operable to transmit data packets having a transmission power level that can be selected from among a number of different power levels and including information of said transmission power level, and to receive data packets from surrounding devices (4); and
a control unit, connected to said transceiver module and configured to control transmission and reception of said data packets by said transceiver module,
wherein said control unit is configured to carry out processing operations on said data packets received from said surrounding devices during a detection time interval in order to determine, on board of said wireless device, proximity relations between said wireless device and said surrounding devices,
and wherein said transceiver module is operable to implement a transceiving protocol including cycles of transmission and reception of said data packets; each of said transmission and reception cycles being separated from a contiguous transmission and reception cycle by a random wait time, the duration of which is dynamically adjustable by said control unit in order to reduce a power consumption of said wireless device, and wherein the timing of said random wait time is determined in a random way within a given time interval; the duration of said given time interval being dynamically adjustable by said control unit and determined, in a current transmission and reception cycle, as a function of a number of data packets received during a given number of preceding transmission and reception cycles; said duration being increased when said number of received data packets decreases, so as to reduce said power consumption when said wireless device is not in the proximity of said surrounding devices.

15. A system for monitoring distance relations, comprising a plurality of wireless devices, each wireless device including:
a transceiver module, operable to transmit data packets having a transmission power level that can be selected from among a number of different power levels and including information of said transmission power level, and to receive data packets from surrounding devices; and
a control unit, connected to said transceiver module and configured to control transmission and reception of said data packets by said transceiver module, said control unit being configured to carry out processing operations on said data packets received from said surrounding devices during a detection time interval in order to determine, on board of said wireless device, proximity relations between said wireless device and said surrounding devices, and
a data-collection infrastructure designed to co-operate with said wireless devices to increase a precision of said proximity relations obtained locally and in a distributed way from each of said wireless devices; said data-collection infrastructure including: a plurality of fixed stations, configured to communicate with said wireless devices to receive at least part of said data packets transmitted by said wireless devices, which include the associated power level from among said different power levels; and a central processing unit, connected to said fixed stations and configured to process said data packets received by said fixed stations to generate, for each one of said wireless devices, a fingerprint vector, the elements of which represent, each, a fraction of packets lost by a respective one of said fixed stations from amongst the ones received from said wireless device at a given one of said different power levels; said central processing unit being configured to increase the precision of said proximity relations between said wireless devices on the basis of relations of similarity between the respective fingerprint vectors.

16. The system according to claim 15, wherein the control units of said wireless devices are configured to control the respective transceiver modules so as to implement an exchange of said data packets with the surrounding devices according to a peer-to-peer scheme of communication.

17. The system according to claim 16, further comprising a data-collection infrastructure; wherein said control unit of each of said wireless devices is further configured to store in an internal memory, and/or transmit to a central processing unit of said data-collection infrastructure, the detected proximity relations; said proximity relations being indicative of a degree of proximity between said wireless devices.

18. The system according to claim 15, wherein said central processing unit is further configured to estimate a position of said wireless devices in a monitoring environment on the basis of the similarity between the respective fingerprint vectors and one or more reference vectors measured at known positions within said monitoring environment , and/or by means of a supervised automatic learning of the associations between said fingerprint vectors and the positions of the corresponding wireless devices.

19. The system according to claim 15, wherein said central processing unit is further configured to estimate a position of said wireless devices on the basis of known positions of said fixed stations and techniques of triangulation and/or trilateration and/or multilateration based on said obtained proximity relations, thereby implementing a proximity-assisted position estimation.

20. The system according to claim 15, configured for monitoring social interactions between individuals, in particular proximity relations of the face-to-face type, wherein said wireless devices are each worn by a respective one of said individuals, in particular on the front of the body; and wherein said transceiver module of said wireless devices is configured to transmit said data packets at a frequency such as to be substantially absorbed by the bodies of said individuals, thereby said data packets are transmitted only in front of said body, for detection of face-to-face proximity relations between said individuals.

* * * * *